(12) United States Patent
Dhinojwaqla et al.

(10) Patent No.: US 11,597,843 B2
(45) Date of Patent: Mar. 7, 2023

(54) MELANIN EXTRACTION FROM BLACK KNOT FUNGUS

(71) Applicants: Ali Dhinojwaqla, Akron, OH (US); K Zin Htut, Yangon (MM); Saranshu Singla, Sangrur (IN); Runyao Zhu, Changchun (CN); Christopher Maurer, Cleveland, OH (US)

(72) Inventors: Ali Dhinojwaqla, Akron, OH (US); K Zin Htut, Yangon (MM); Saranshu Singla, Sangrur (IN); Runyao Zhu, Changchun (CN); Christopher Maurer, Cleveland, OH (US)

(73) Assignee: The University of Akron, Akron, OH (US)

( * ) Notice: Subject to any disclaimer, the term of this patent is extended or adjusted under 35 U.S.C. 154(b) by 30 days.

(21) Appl. No.: 17/135,162

(22) Filed: Dec. 28, 2020

(65) Prior Publication Data

US 2021/0269646 A1 Sep. 2, 2021

Related U.S. Application Data

(60) Provisional application No. 62/982,815, filed on Feb. 28, 2020.

(51) Int. Cl.
C09B 61/00 (2006.01)
C09B 69/00 (2006.01)

(52) U.S. Cl.
CPC .............. *C09B 61/00* (2013.01); *C09B 69/00* (2013.01)

(58) Field of Classification Search
CPC . C09B 61/00; C09B 67/0083; C09B 67/0097; C09B 67/0092; C09B 69/00
USPC ............................................................ 8/438
See application file for complete search history.

(56) References Cited

U.S. PATENT DOCUMENTS

| 7,081,442 B2 * | 7/2006 | Sei ........................... A61K 8/72 424/59 |
| 8,815,539 B1 * | 8/2014 | Popa ........................ C12P 1/00 530/300 |

OTHER PUBLICATIONS

English abstract of the Patent No. CN109320993A dated Jun. 22, 2022.*

* cited by examiner

*Primary Examiner* — Eisa B Elhilo
(74) *Attorney, Agent, or Firm* — Renner, Kenner, Greive, Bobak, Taylor & Weber

(57) ABSTRACT

In various embodiments, the present invention is directed to a melanin composition extracted from black knot fungus (*Apiosporina morbosa*) using an acid-base extraction technique. In one or more embodiments, the melanin composition is extracted from the black outer layer of a black knot fungus by obtaining a powder including a black outer part of one or more black knot fungus, adding a quantity of an aqueous solution comprising one or more base, heating the mixture to solubilize a melanin in the aqueous solution to form a black alkaline supernatant containing said melanin, adding one or more acids to said black alkaline supernatant until the melanin precipitates out of said black alkaline supernatant, said melanin precipitate further comprising proteins, carbohydrates, and lipids; collecting the melanin precipitate and adding one or more acids to hydrolyze some or all of said proteins, carbohydrates, and lipids and produce the melanin composition.

19 Claims, 9 Drawing Sheets

MELANIN EXTRACTION FROM BLACK KNOT FUNGUS

CROSS REFERENCE TO RELATED APPLICATIONS

This application claims the benefit of U.S. provisional patent application Ser. No. 62/982,815 entitled "Melanin Extraction from Black Knot Fungus," filed Feb. 28, 2020, and incorporated herein by reference in its entirety.

STATEMENT REGARDING FEDERALLY SPONSORED RESEARCH OR DEVELOPMENT SUPPORT

This invention was made with government support under grant number FA-9550-18-1-0142 awarded by the Air Force Office of Scientific Research. The government has certain rights in the invention.

FIELD OF THE INVENTION

One or more embodiments of the present invention relates to a natural melanin. In certain embodiments, present invention relates to a natural melanin extracted from Black Knot Fungus (*Apiosporina morbosa*).

BACKGROUND OF THE INVENTION

Melanin, a ubiquitous pigment that is found in many organisms ranging from bacteria to mammals, is a heterogeneous polymer comprised of phenolic and indolic polymeric compounds. Melanin can be broadly categorized into three different groups on the basis of their structure and monomer units: eumelanin, pheomelanin, and allomelanin (including pyomelanin, DHN-melanin, HPQ-melanin, and catechol melanin), with eumelanin being the most common one. Melanin possesses many unique properties, including high refractive index (~1.8-2), broadband absorption spectrum ranging from ultraviolet (UV) to visible and infrared radiation, radical quenching ability, metal ion chelation, and high antioxidant activity, because of which melanin is thought of as the next generation material for use in cosmetics, paints, biomedical, and space applications thereby increasing its demand. Therefore, large-scale production of melanin is desirable to meet this growing demand.

Over the years, efforts have been made to extract melanin from various natural sources and to synthesize melanin using different chemical precursors. So far, melanin has been extracted from cuttlefish (*Sepia officinalis*) inks, black fish crow feathers (*Corvus ossifragus*), wild turkey feathers (*Melleagris gallopavo*), black human hair, black garlic, various fungi (*Cryptococcus neoformans, Aspergillus fumigatus*, and *Colletotrichum lagenarium*) and bacteria. Melanin has also been synthesized using dopamine, L-DOPA, and 1, 8 dihyroxynapthalene (1, 8-DHN) precursors. However, the commercially available natural and synthetic melanin are very expensive highlighting the need for alternative cheaper sources for large-scale production of melanin.

One such alternative source may be the Black Knot fungus. Black knot is a widespread disease in the North America caused by the pathogenic ascomycetes fungus (*Apiosporina morbosa*) that infects the woody parts of plum, cherry, apricot, and chokecherry trees, mainly twigs and branches but occasionally trunks. Following germination of spores, the fungus penetrates the host tree's tissues and stimulates an abnormal tumor-like outgrowth, which matures and darkens over time into hard and woody black knots (~0.5-2" diameter and >1" length). The disease results in poor fruit production and in some cases where most of the branches are infested, it may cause death of the whole tree. Works have been done to control the black knot disease, where the knot-infested twigs and branches are pruned and burnt down to control the infection. However, to date, no reports exist on extracting melanin from these readily available black knots.

What is needed in the art is a cheaper and more readily available source of melanin to meet the increased demands for use in next generation materials for use in cosmetics, paints, biomedical, and space applications.

SUMMARY OF THE INVENTION

In various embodiments, the present invention is directed to a cheaper and more readily available source of melanin to meet the increased demands for use in next generation materials for use in cosmetics, paints, biomedical, and space applications extracted from the black knot fungus. In various embodiments, melanin is extracted from the pathogenic black knot fungus with a yield of ~10% using the acid-base extraction method. The extracted melanin shows irregular morphology, and its chemical structure is similar to melanin derived from 1, 8-dihroxynaphthalene (DHN), elucidated using spectroscopic techniques including infrared, solid-state NMR (ss-NMR), and x-ray photoelectron spectroscopy (XPS). Further, the extracted melanin shows broadband ultraviolet (UV) absorption, characteristic of melanin. Because of cheap and wide availability of black knots, and it being an invasive species, it is believed that black knots can serve as an alternative source for obtaining melanin at a cheaper cost, which could be used as UV light absorber and antioxidant agent in cosmetics and other industries.

In a first aspect, the present invention is directed to a melanin composition extracted from black knot fungus (*Apiosporina morbosa*) using an acid-base extraction technique. In some embodiments, the acid-base extraction technique comprises: obtaining a powder comprising a black outer part of one or more black knot fungus (*Apiosporina morbosa*), adding a quantity of an aqueous solution comprising one or more base, and heating the mixture to solubilize a melanin in the aqueous solution to form a black alkaline supernatant containing the melanin; adding one or more acids to the black alkaline supernatant until the melanin precipitates out of the black alkaline supernatant, the melanin precipitate further comprising proteins, carbohydrates, and lipids; and collecting the melanin precipitate and adding one or more acids to hydrolyze some or all of the proteins, carbohydrates, and lipids and produce the melanin composition. In one or more of these embodiments, the melanin composition will comprise 1, 8-dihroxynaphthalene (DHN) melanin. In some embodiments, the melanin composition will comprise a polymer having one or more 1, 8-dihroxynaphthalene (DHN) melanin repeating units.

In some embodiments, the acid-base extraction technique used to produce the melanin composition comprises the steps of: obtaining one or more black knot fungus (*Apiosporina morbosa*) having a black outer part and an inner wooden part; scraping the black outer part off of the inner wooden part, collecting it, and grinding it to a powder; boiling the powder in water to remove bacteria and dust; removing the water to leave a black residue of the powder; adding a quantity of an aqueous solution comprising one or more base to the black residue of the powder and autoclaving the mixture to solubilize the melanin in an aqueous environment and form a mixture having an aqueous black alkaline supernatant; collecting a black alkaline supernatant from the mixture and adding one or more acids to the black alkaline supernatant until the melanin precipitates out of the black alkaline supernatant, the melanin precipitate further comprising proteins, carbohydrates, and lipids; and collecting the melanin precipitate and refluxing it with one or more acids to hydrolyze some or all of the proteins, carbohydrates, and lipids and produce the melanin composition. In some embodiments, the one or more base is NaOH. In some of these embodiments, the step of autoclaving the mixture with one or more bases mixture to solubilize the melanin comprises: autoclaving the mixture a first time at a temperature of from about 100° C. to about 120° C. for from about 10 min to about 20 min; and autoclaving the mixture a second time at a temperature of from about 100° C. to about 120° C. for from about 10 min to about 20 min. In some of these embodiments, the one or more acids used to precipitate the melanin comprises concentrated HCl. In some embodiments, the step of adding one or more acids to precipitate the melanin comprises adding concentrated HCl to the black alkaline supernatant until the pH of the mixture reaches about 1.0. In some embodiments, the step of collecting the melanin precipitate from the black supernatant is performed by centrifugation.

In one or more embodiments, the step of refluxing the melanin precipitate with one or more acids to hydrolyze some or all of the proteins, carbohydrates, and lipids comprises refluxing the melanin precipitate in a concentrated HCl acid solution for from about 2 to 48 hours. In some of these embodiments, the acid-base extraction technique further comprises the steps of: washing the melanin composition in deionized water and then in methanol; and washing the melanin composition again in deionized water and then lyophilizing it to form a powder comprising the melanin composition.

In a second aspect, the present invention is directed to a method for extraction of melanin from black knot fungus comprising: obtaining a powder comprising a black outer part of one or more black knot fungus (*Apiosporina morbosa*), adding a quantity of an aqueous solution comprising one or more base, and heating the mixture to solubilize a melanin in the aqueous solution to form a black alkaline supernatant containing the melanin; adding one or more acids to the black alkaline supernatant until the melanin precipitates out of the black alkaline supernatant, the melanin precipitate further comprising proteins, carbohydrates, and lipids; and collecting the melanin precipitate and adding one or more acids to hydrolyze some or all of the proteins, carbohydrates, and lipids and produce the melanin composition.

In a second aspect, the present invention is directed to a method for the extraction of melanin from black knot fungus comprising: obtaining one or more black knot fungus (*Apiosporina morbosa*) having a black outer part and an inner wooden part; scraping the black outer part off of the inner wooden part, collecting it, and grinding it to a powder; boiling the powder in water to remove bacteria and dust; removing the water to leave a black residue of the powder; adding a quantity of an aqueous solution comprising one or more base to the black residue of the powder and autoclaving the mixture to solubilize the melanin in an aqueous environment and form a mixture having an aqueous black alkaline supernatant; collecting a black alkaline supernatant from the mixture and adding one or more acids to the black alkaline supernatant until the melanin precipitates out of the black alkaline supernatant; and collecting the melanin precipitate and refluxing it with one or more acids to hydrolyze proteins, carbohydrates, and lipids in the melanin precipitate and produce the melanin composition. In one or more of these embodiments, the one or more base is NaOH. In various embodiments, the one or more acids comprises concentrated HCl. In some of these embodiments, the step of adding one or more acids comprises adding concentrated HCl until the pH of the mixture reaches about 1.0.

In some of these embodiments of the present invention, the step of autoclaving the mixture with one or more bases comprises: autoclaving the mixture a first time at a temperature of from about 100° C. to about 120° C. for from about 10 min to about 20 min; and autoclaving the mixture a second time at a temperature of from about 100° C. to about 120° C. for from about 10 min to about 20 min. In one or more embodiments. the step of refluxing the melanin precipitate with one or more acids to hydrolyze proteins, carbohydrates, and lipids in the melanin precipitate comprises refluxing the melanin precipitate in a concentrated HCl acid solution for from about 2 to 48 hours. In some embodiments, the method further comprises: washing the melanin composition in deionized water and then in methanol and washing the melanin composition again in deionized water and then lyophilizing it to form a powder comprising the melanin composition.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF THE ILLUSTRATIVE EMBODIMENTS

Figure 1A:
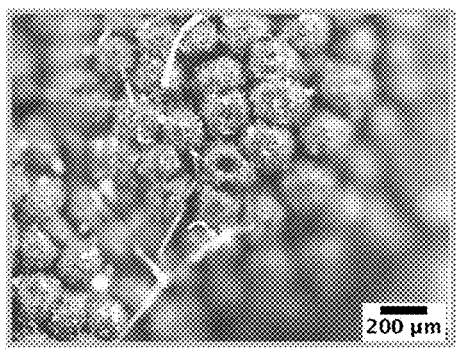
FIGS. 1A-B are an optical image (FIG. 1A) and an SEM image (FIG. 2B) of the black knot fungus, where the knot appears as a cluster of ~150 μm nodules.

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure.

The following terms may have meanings ascribed to them below, unless specified otherwise. As used herein, the terms "comprising" "to comprise" and the like do not exclude the presence of further elements or steps in addition to those listed in a claim. Similarly, the terms "a," "an" or "the" before an element or feature does not exclude the presence of a plurality of these elements or features, unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein in the specification and the claim can be modified by the term "about."

It should be also understood that the ranges provided herein are a shorthand for all of the values within the range and, further, that the individual range values presented herein can be combined to form additional non-disclosed ranges. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

All publications, patent applications, patents, and other references mentioned herein are expressly incorporated by reference in their entirety, which means that they should be read and considered by the reader as part of this text. That the document, reference, patent application, or patent cited in this text is not repeated in this text is merely for reasons of conciseness. In the case of conflict, the present disclosure, including definitions, will control. All technical and scientific terms used herein have the same meaning. Further, any compositions or methods provided herein can be combined with one or more of any of the other compositions and methods provided herein. The fact that given features, elements or components are cited in different dependent claims does not exclude that at least some of these features, elements or components maybe used in combination together.

Figure 1B:
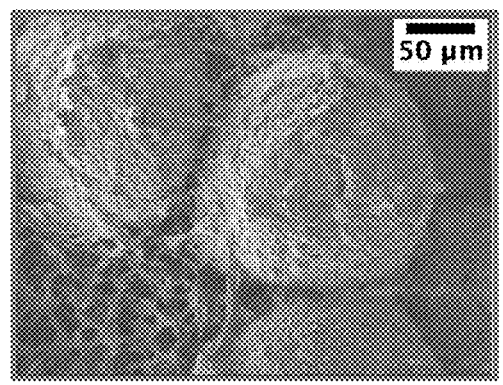
Figure 2:
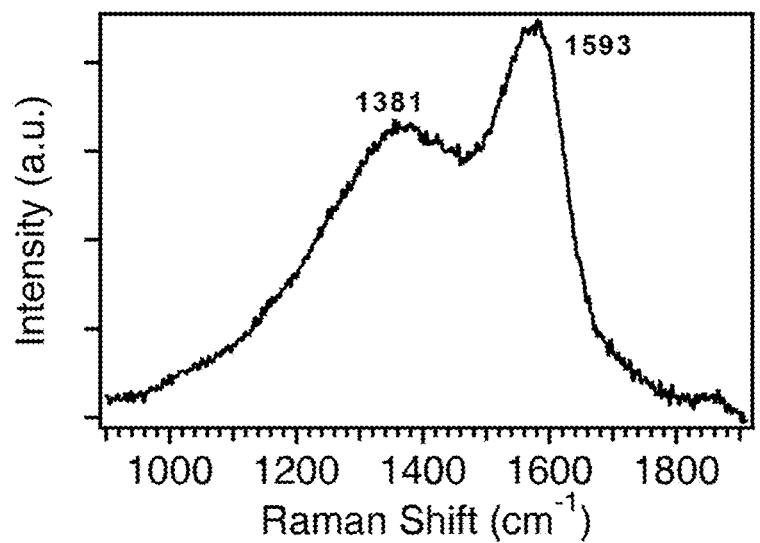
FIG. 2 is a representative Raman spectrum of the black knot showing characteristic melanin peaks at 1381 $cm^{-1}$ and 1593 $cm^{-1}$.

In various embodiments, the present invention is directed to a melanin composition extracted from black knot fungus (*Apiosporina morbosa*) using an acid-base extraction technique. As set forth above, black knot disease, caused by the pathogenic fungus *Apiosporina morbosa*, results in a tumor-like outgrowth on branches of fruit trees including cherry, which darkens over time into hard-woody black knots. Under the optical microscope and SEM, the knots appear as a cluster of ~150 μm nodules (FIGS. 1A-B). The dark color of the knots could be taken as an indicator of melanin inside these knots. To further establish the existence of melanin, Raman spectroscopy was used identify melanins in the black knot samples. FIG. 2 shows a representative Raman spectrum of the black knot, which shows two characteristic melanin peaks at ~1380 $cm^{-1}$ and ~1590 $cm^{-1}$ attributed to the vibrations of carbon atoms arranged in domains similar to graphite.

In a first aspect, the present invention is directed a melanin composition extracted from the black knot fungus using an acid-base extraction technique. As will be understood by those of skill in the art, the term "melanin" was originally used to broadly refer to any naturally occurring black pigment and as such, has come to refer to a broad range of different black materials comprising a heterogeneous polymer comprised of phenolic and indolic polymeric compounds. As set forth above, melanin can be broadly categorized into three different groups on the basis of their structure and monomer units: eumelanin, pheomelanin, and allomelanin (including pyomelanin, DHN-melanin, HPQ-melanin, and catechol melanin), with eumelanin being the most common one.

Figure 3A:
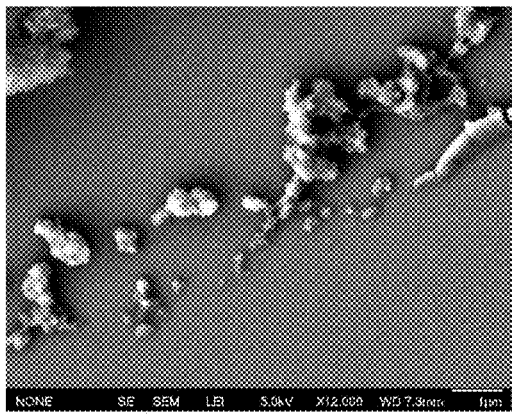
FIGS. 3A-B are SEM Images of extracted melanin from black knot fungus according to one or more embodiment of the present invention. (scale bar: 1 μm)
Figure 3B:
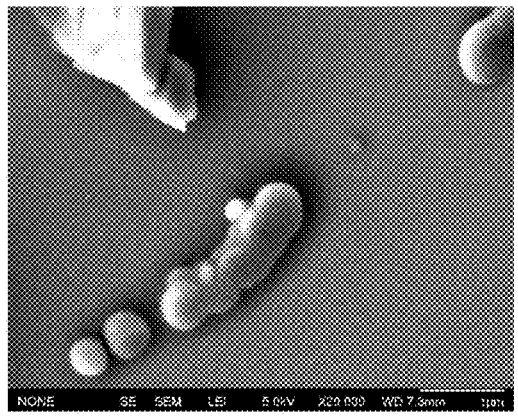

FIGS. 3A-B are SEM images of a melanin composition according to one or more embodiment of the present invention. The SEM images show that the extracted black knot melanin has an irregular morphology that is different from other natural melanin. Additionally, the TEM images show that the extracted black knot melanin is composed of 20-30 nm diameter spherical aggregates (FIG. 11). Further analysis indicates that chitin has been successfully removed from the black knot melanin. The melanin composition of the extracted black knot melanin comprises DHN melanin polymer chains formed from two or more 1, 8-dihydroxynaphthalene (DHN) melanin repeating units. In some embodiments, the melanin composition of the present invention will also contain residual lipids not removed from the black knot melanin composition during the extraction process. In addition, the melanin composition of the present invention exhibits a desirable broadband monotonic absorption of light and is much less expensive to produce than conventional natural and synthetic melanin.

Figure 4:
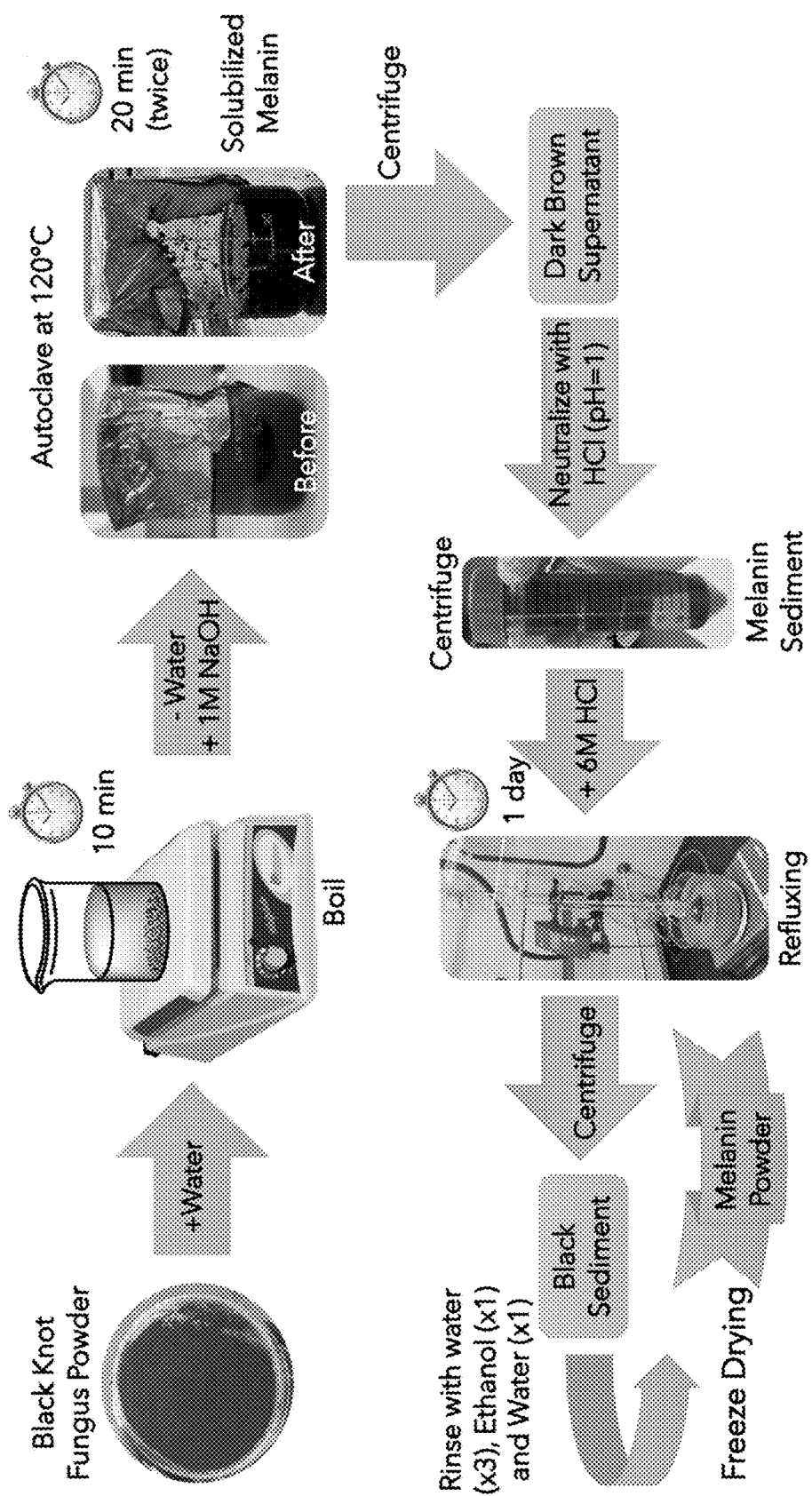
FIG. 4 is a schematic drawing showing an acid-base method utilized for extraction and purification of melanin present in black knots according to various embodiments of the present invention.

In another aspect, the present invention is directed to methods for extracting the melanin described above from black knot fungus. Because the black knots are chitin-rich materials, the present invention uses an acid-base extraction procedure to obtain the melanin from these knots (FIG. 4). In general outline, the acid-base extraction process utilizes the ability of melanin to be solubilized with in highly basic conditions. The ground black knot fungus is treated with a highly basic aqueous solution until the melanin found in the black knot dissolves into the solution. The solution is then collected as a black alkaline supernatant containing black knot melanin. Finally, an acid solution is added to bring the pH of the supernatant down, causing the melanin to precipitate from the solution, where it can be collected and further purified.

Figure 5:
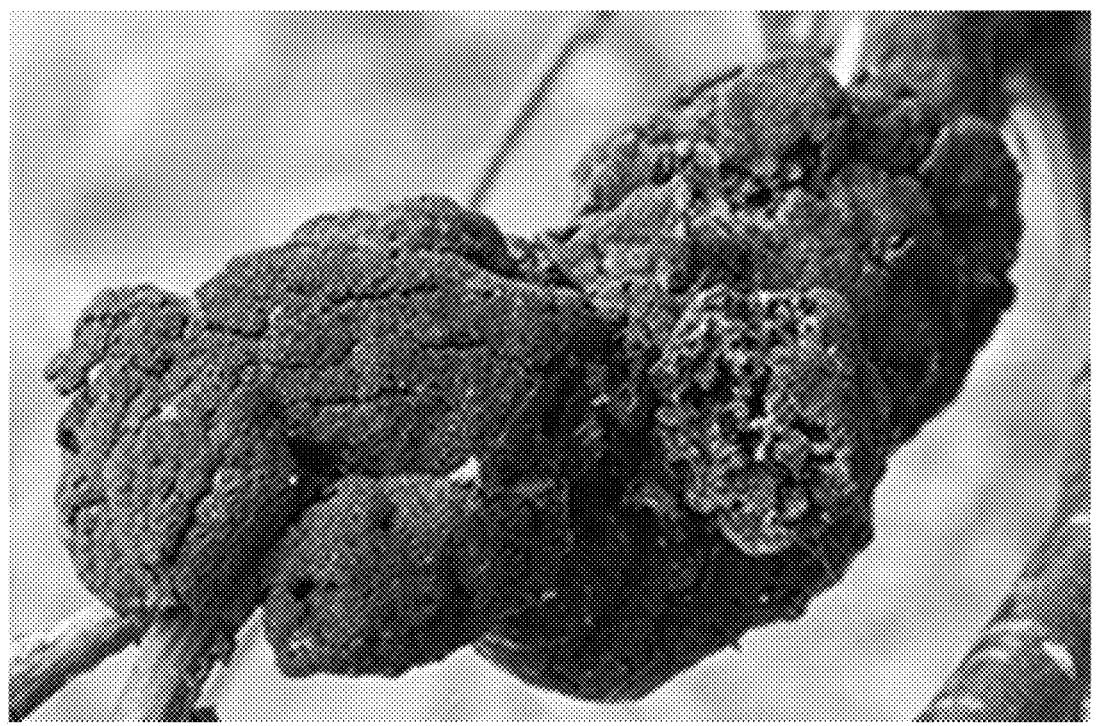
FIG. 5 is an optical image of a black knot fungus.

In various embodiments, the melanin composition may be prepared as shown in FIG. 4. The black knot fungus is shown in FIGS. 1A-B and 5. As set forth above, the black knot fungus (*Apiosporina morbosa*) that infects the woody parts of plum, cherry, apricot, and chokecherry trees, mainly twigs and branches but occasionally trunks. Following germination of spores, the fungus penetrates the host tree's tissues and stimulates an abnormal tumor-like outgrowth, which matures and darkens over time into hard and woody black knots (~0.5-2" diameter and >1" length). These tumor-like structures (FIG. 5) have a substantially black outer layer covering a more woody inner growth. In one or more of these embodiments, the black outer layer of one or more black knots is collected, preferably by scraping it off the inner woody growth. While not absolutely necessary, these scrapings are preferably ground to a powder to facilitate extraction of the melanin.

Once they have been collected, the ground black knot scrapings are preferably boiled in water to further soften them and to remove any bacteria or dust that may be present. In various embodiments, the ground black knot scrapings are boiled for from about 10 min to about 60 min. The water is then removed to leave a black residue. Next, an aqueous solution comprising at least one base is added to the black residue and the mixture is heated, preferably in an autoclave. As set forth above, it is known that melanin can be solubilized into water with heat in an alkaline environment, preferably with heat. The aqueous base selected is not particularly limited provided that it is strong enough to solubilize the melanin and does not react with, degrade or destroy the melanin being extracted. The base (or bases) used is preferably a strong base. As used herein, a "strong" base is a base that is 100% ionized in solution. Suitable aqueous bases may include, but are not limited to NaOH, KOH, LiOH, RbOH, CsOH, $NH_4OH$, $N(CH_3)_4OH$; $CH_3NH_2$, and combinations thereof, but NaOH is preferred.

One of ordinary skill in the art will be able to select a suitable aqueous base without undue experimentation. As will be apparent, the aqueous base solution should be sufficiently alkaline to solubilize the melanin under at the temperature being used. In various embodiments, the aqueous base solution will have a pH of from about 11 to about 14, depending on the base or bases used. In some embodiments, the aqueous base solution will be a 1M NaOH solution.

While the dissolution of melanin can be performed using a wide temperature range (typically, room temperature-130° C.), all other things being equal, increasing the temperature reduces the time required for dissolving the melanin completely. Accordingly, in one or more embodiments, the aqueous base solution will be heated at least once, preferably in an autoclave, at a temperature and for a duration sufficient to facilitate solubilization of the melanin. While heating the solution will speed dissolution of the melanin, the solution should not, of course, be heated to a temperature that damages the melanin or other reagents. In one or more embodiments, the aqueous base solution is heated in an autoclave at a temperature of from about 100° C. to about 120° C. to aid in solubilizing the melanin. In various embodiments, the aqueous base solution is heated in an autoclave for from about 10 min to about 20 min. In some embodiments, the aqueous base solution is heated in an autoclave at a temperature of about 120° C. for 20 min twice to ensure that as much melanin as possible is solubilized. In some other embodiments, the aqueous base solution may be heated in an autoclave as set forth above three or more times to ensure that as much melanin as possible is solubilized.

Next, the mixture is separated into the remaining solid material and a black alkaline supernatant containing the dissolved melanin by centrifugation, filtration, or other suitable method. One of ordinary skill in the art will be able to separate the black alkaline supernatant containing the dissolved melanin from the remaining solid material without undue experimentation. In some of these embodiments, the black alkaline supernatant solution containing the dissolved melanin is separated from the remaining components by centrifugation at 8000 rpm for 15 min.

To recover the melanin from the black alkaline supernatant solution, the solution is acidified until the melanin is no longer soluble in the aqueous solution and precipitates out of solution. In various embodiments, the black alkaline supernatant solution is acidified by the addition of a concentrated acid solution comprising at least one acid. The particular acid (or acids) selected is not particularly limited provided that the acids used are strong enough when concentrated to acidify the black alkaline supernatant solution and do not react with or otherwise damage or destroy the melanin being extracted. Suitable acids may include, without limitation, HCl, $HNO_3$, $H_2SO_4$, HBr, HI, $HClO_4$, $HClO_3$, and combinations thereof. One of ordinary skill in the art will be able to select a suitable acid solution without undue experimentation. As will be apparent, the acid solution should be sufficiently acidic (concentrated) to acidify the black alkaline supernatant solution to the point the melanin precipitates out of solution. In various embodiments, the acid solution will have a pH of from about 1 to about 2. In some embodiments, the aqueous base solution will be a concentrated HCl solution. In some of these embodiments, the aqueous acid solution will be a 37% HCl solution.

The acid solution described above is added to the black alkaline supernatant solution until the supernatant solution is sufficiently acidified to force substantially all of the dissolved melanin out of solution. The amount of acid solution required will, of course, depend upon the strength of the acid used and the overall pH of the acid solution used. In one or more embodiment, a concentrated HCl solution (37%) is gradually added to the supernatant solution until the pH of the solution reaches about 1.0.

The precipitated melanin may be collected from the now acidic black supernatant solution by any suitable means known in the art for that purpose, including but not limited to, centrifugation, filtration, filtration under a vacuum, sedimentation, or a combination thereof. In some embodiments, extracted black knot melanin is collected by centrifugation at 8000 rpm for 15 min.

As will be understood by those of skill in the art, in addition to polymerized DHN melanin repeating units, the extracted black knot melanin will also include various proteins, carbohydrates, and lipids associated with melanin. In some embodiments, the extracted black knot melanin material is refluxed in an acid solution to hydrolyze some or all of these proteins, carbohydrates, and lipids. The acid solution used for this purpose may be the same or different than the one that was used to acidify the black alkaline supernatant solution but will be an acid solution as described above. The length of time that the natural melanin material is refluxed will, of course, depend upon the strength of the acid solution being used, as well as the quantity and specific composition of any proteins, carbohydrates, and lipids present in the melanin. In various embodiments, the extracted black knot melanin material may be refluxed for from about 2 to about 48 hours. In one or more of these embodiments, the extracted black knot melanin material is refluxed in an 37% HCl acid solution for 1 day to hydrolyze the proteins, carbohydrates, and lipids associated with black knot melanin.

The extracted black knot melanin may be rinsed and/or further cleaned and purified using any suitable methods known in the art for that purpose and one of ordinary skill in the art will be able to do so without undue experimentation. In one or more embodiments, the extracted black knot melanin is rinsed with deionized water and/or ethanol or methanol to remove any remaining water-soluble byproducts of the hydrolysis of the proteins, carbohydrates, and lipids, as well as any other water-soluble impurities that may be present. In some of these embodiments, the extracted black knot melanin rinsed three or more times with deionized water, then once in ethanol, and then again with the deionized water. Finally, the extracted black knot melanin may be lyophilized it to obtain a black knot melanin powder according to one or more embodiments of the present invention.

It has been found that the melanin composition of the present invention may be obtained at a considerable (10%) yield using the methods described herein. Since these black knots are available at a cost of only 10 USD/lb, much less than the sources conventionally used to obtain melanin. Thus, it is believed that black knot could serve as an important alternative source for producing melanin at a much cheaper cost.

Melanin possesses many unique properties, including high refractive index (~1.8-2), broadband absorption spectrum ranging from ultraviolet (UV) to visible and infrared radiation, radical quenching ability, metal ion chelation, and high antioxidant activity, because of which melanin is thought of as the next generation material for use in cosmetics, paints, biomedical, and space applications thereby increasing its demand.

Figure 6:
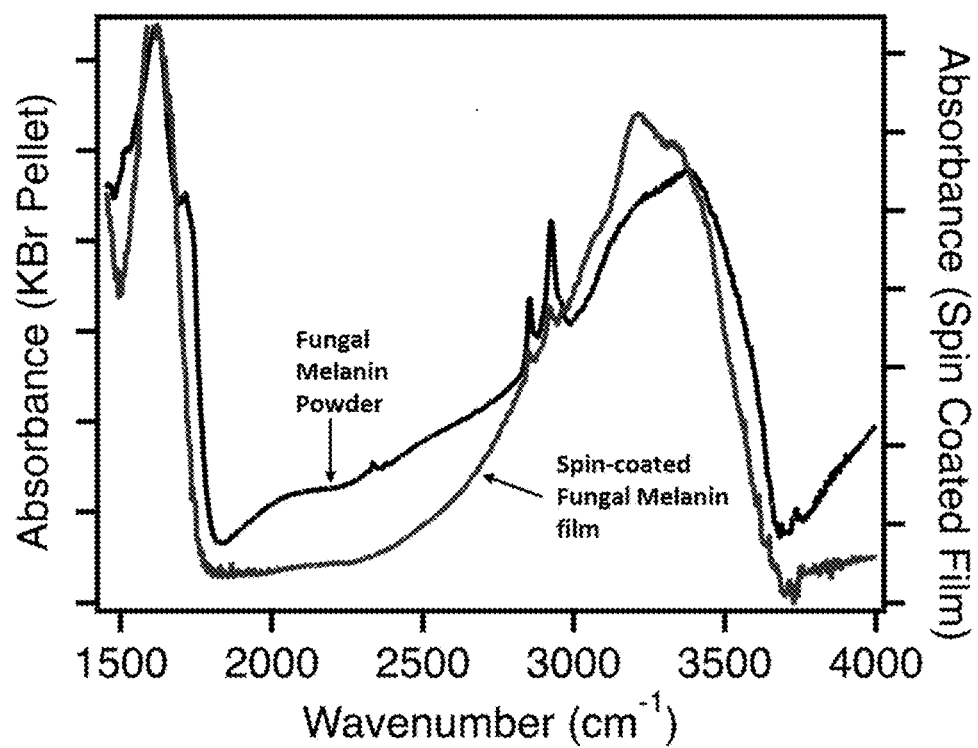
FIG. 6 is a comparison of IR spectra of fungal melanin powder according to the present invention and a spin-coated fungal melanin film.

In various embodiments, it is believed that the melanin composition of the present invention can be used to form ultraviolet (UV)-shielding coatings. It is believed that the melanin extracted from the black knot fungus could be solubilized in basic media to create thin films using dip-coating, spin coating, or drop casting. The solubilized melanin retains the original properties of the extracted melanin as demonstrated in the similarity of the IR spectra of extracted melanin powder (collected by forming a KBr pellet) and the spin-coated melanin film (collected using a calcium fluoride window). (See FIG. 6) Since melanin has a high refractive index (~1.74), the high refractive index melanin coatings could be alternated with low refractive index inorganic or polymeric layers to create multilayer coatings, similar to those found in Jewel beetles. (See, e.g., S. Yoshioka, S. Kinoshita, H. Iida, and T. Hariyama, "Phase-adjusting layers in the multilayer reflector of a jewel beetle," *J. Phys. Soc. Japan*, vol. 81, no. 5, pp. 1-7, 2012, the disclosure of which is incorporated herein by reference in its entirety) The interaction of light with these multilayer coatings would cause constructive interference of only specific wavelengths of light thereby resulting in a particular structural color. The color can be tuned by changing the thickness of the alternating layers or by choosing the appropriate low refractive index material. These multilayer coatings could be used in paints because of their resistance to fading and enhanced photoprotection (due to broadband absorption spectrum of melanin). Further, it is believed that the melanin composition may be used to provide improved mechanical properties to polymer matrices, improved anti-oxidant properties for use in protecting composites from any light-induced damage in such things as food packaging films, biomedical packaging, and military applications, and providing protection from ionizing radiation (X-rays and Gamma rays).

EXPERIMENTAL

To better understand and further reduce the melanin composition of the present invention to practice, a melanin composition of the present invention was produced from black knot fungus as described above and its chemistry and morphology characterized using a combination of spectroscopic techniques including FTIR, NMR, and XPS, and SEM.

Characterization of the Extracted Black Knot Melanin

1. Scanning Electron Microscopy (SEM) and Transmission Electron Microscopy (TEM)

The extracted melanin from black knot fungus was observed using SEM (FIGS. 1A-B), which depicts an irregular morphology unlike melanin from other biological sources. The irregular morphology could be a consequence of the acid-base extraction procedure. It was observed using TEM (FIG. 11 A-B), that the extracted melanin from black knot fungus is composed of aggregation of ~20-30 nm (in diameter) small spherical units, resembling the supramolecular structure of other melanins.

2. Fourier-Transform Infrared Spectroscopy (FTIR)

Figure 7:
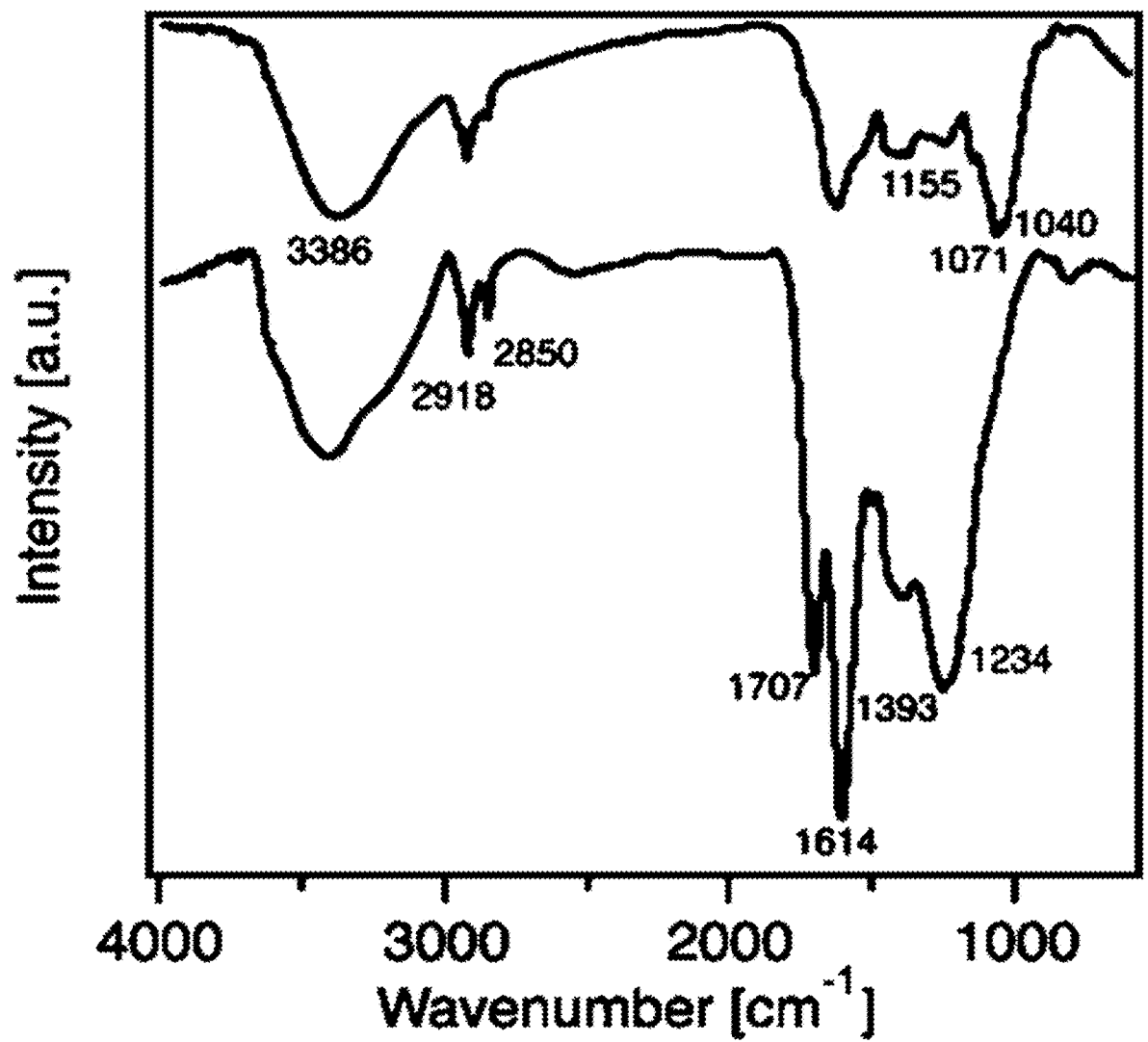
FIG. 7 is a comparison of the FTIR spectra of black knot powder (upper line) and extracted black knot melanin (lower line) according to the present invention.

The infrared spectra obtained for black knot powder (before extraction) and extracted melanin (after extraction) are shown in FIG. 7. The assignments for FIG. 7 are identified in Table 1, below.

TABLE 1

Characteristic FTIR center peak positions together with its corresponding assignments of BKF (*A. morbosa*) melanin after extraction (See, FIG. 7).

| Peak Position | Assignment |
| --- | --- |
| ~3400 | O—H stretch |
| 3000-3100 | aromatic C—H stretch |
| 2850, 2918 | aliphatic C—H stretch (due to lipids) |
| 1707 | C=O |
| 1614 | aromatic C=C |
| 1393 | OH deformation |
| 1234 | C—OH stretching |
| 757-811 | C—H deformation of benzine ring |

As can be seen, the IR spectrum before extraction for the black knot fungus powder shows strong peaks at 1040 and 1071 $cm^{-1}$, assigned to the C—O stretching vibration in the chitin structure. The peak at ~1155 $cm^{-1}$ is assigned to the C—O—C ring stretching vibration in the chitin structure, while and 3386 cm is assigned to O—H stretching vibration. These peaks are typical of carbohydrates. They are mainly from chitin structure binding with melanin particles in the fungal cell-wall along with mannoprotein and phospholipids. After the acid-base extraction, the intensity of the peaks associated with chitin (1040, 1071, 1155 and 3386 cm') decrease significantly in the BKF-melanin spectrum, suggesting the removal of chitin during the extraction. Also, a decrease in the intensity of peaks at 2850 and 2920 $cm^{-1}$ assigned to stretching vibration of aliphatic C—H group, which suggests a possible partial removal of lipids from the melanin after extraction from the fungal cell-wall (FIG. 7). After extraction, the melanin extracted from the black knot fungus shows peaks at 1614 $cm^{-1}$ and 1707 $cm^{-1}$ corresponding to the aromatic C=C and C=O stretching or stretching vibrations, respectively. In addition, the peaks observed at 1234 and 1394 cm$^{-1}$ corresponding to C—OH stretching and OH deformation, respectively, suggested the extracted melanin is of DHN chemistry. The C—H deformation of the benzene ring between 757-811 cm$^{-1}$ further supported similarities to DHN chemistry.

3. Solid-State NMR

Figure 9A:
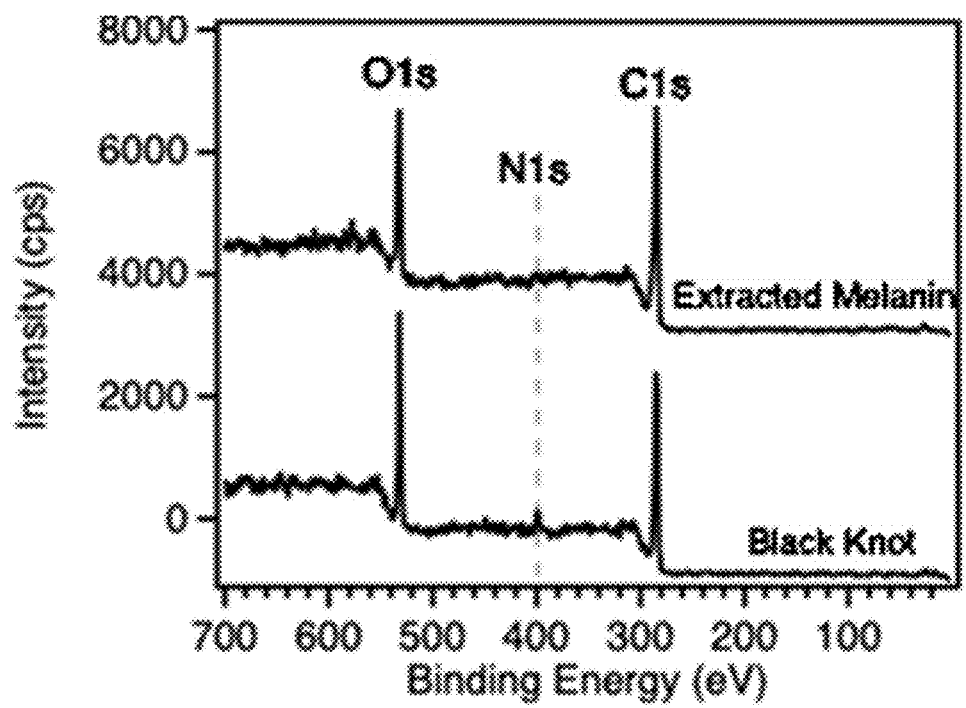
FIGS. 9A-D are a XPS survey scans for black knot powder and extracted melanin (the spectra have been vertically offset for clarity) (FIG. 9A), high-resolution C1s spectra for the black knot powder and extracted melanin (FIGS. 9B and 9D, respectively) showing the fit line and the individual bands from curve fitting having been indicated on the graph, and a comparison of high-resolution N1s spectra for both black knot powder and extracted melanin samples (FIG. 9C).
Figure 9B:
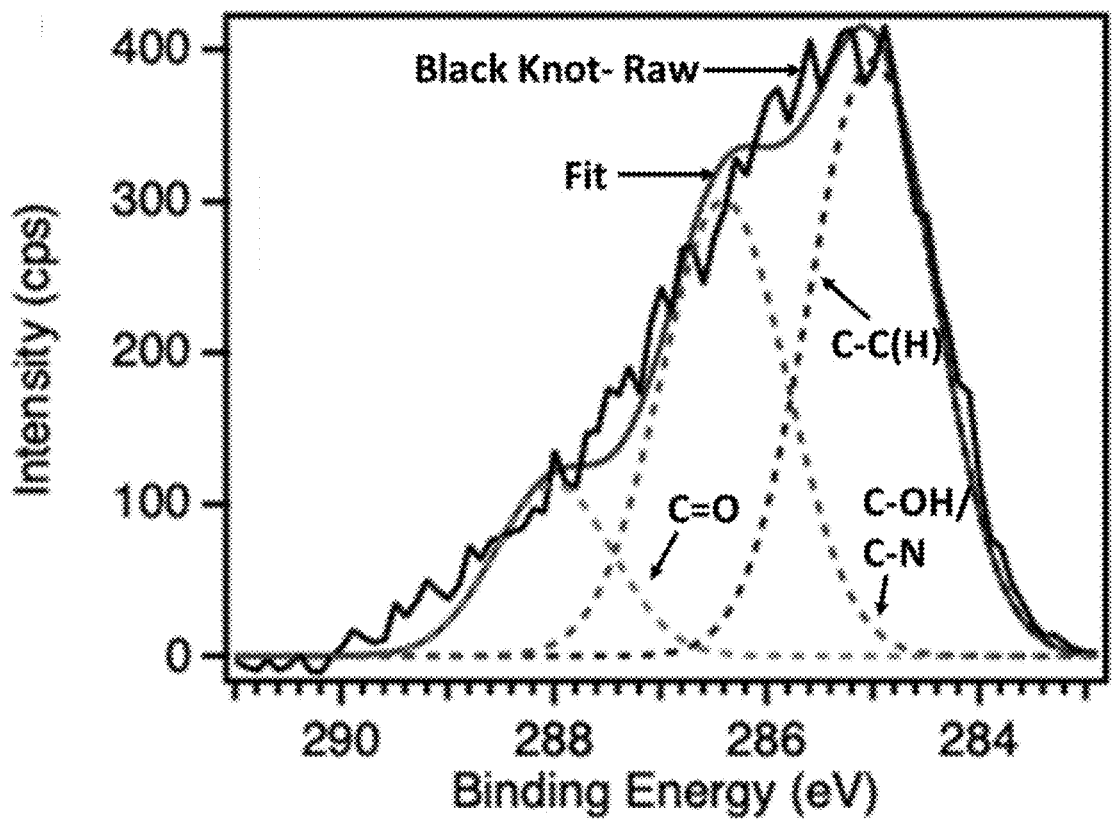

To confirm the chemical structure obtained using FTIR, ssNMR spectra were collected for the sample before and after extraction using spin echo (SE) and dipolar dephasing (DD) mode. The SE NMR spectrum provides information on all the carbon atoms (protonated and deprotonated) present in the sample, while DD NMR spectrum only analyzes the non-protonated carbon atoms. FIG. 9A-B show a comparison of NMR spectra for the sample before and after extraction. Similar to the IR, the before extraction NMR spectrum shows strong chitin signals (marked by blue dashed lines): 22 (—CH$_3$), 55 (C2), 60 (C6), 71 (C3), 74 (C5), 83 (C4), 104 (C1), and 173 ppm (C═O). However, after extraction, the chitin peaks decrease significantly again emphasizing the removal of chitin using the abovementioned extraction procedure. The extracted melanin NMR spectra show peaks between 100-160 ppm attributed to the phenoxy carbon atoms in the DHN melanin structure (FIG. 9B). The peak at 173 ppm is attributed to the C═O in the DHN melanin intermediates such as scylatone or Vermelone. Similar to IR, strong aliphatic signals (20-30 ppm) are observed in NMR spectrum of extracted melanin, which could indicate the presence of lipids (not completely removed using the above extraction method).

4. X-Ray Photoelectron Spectroscopy (XPS)

Figure 9C:
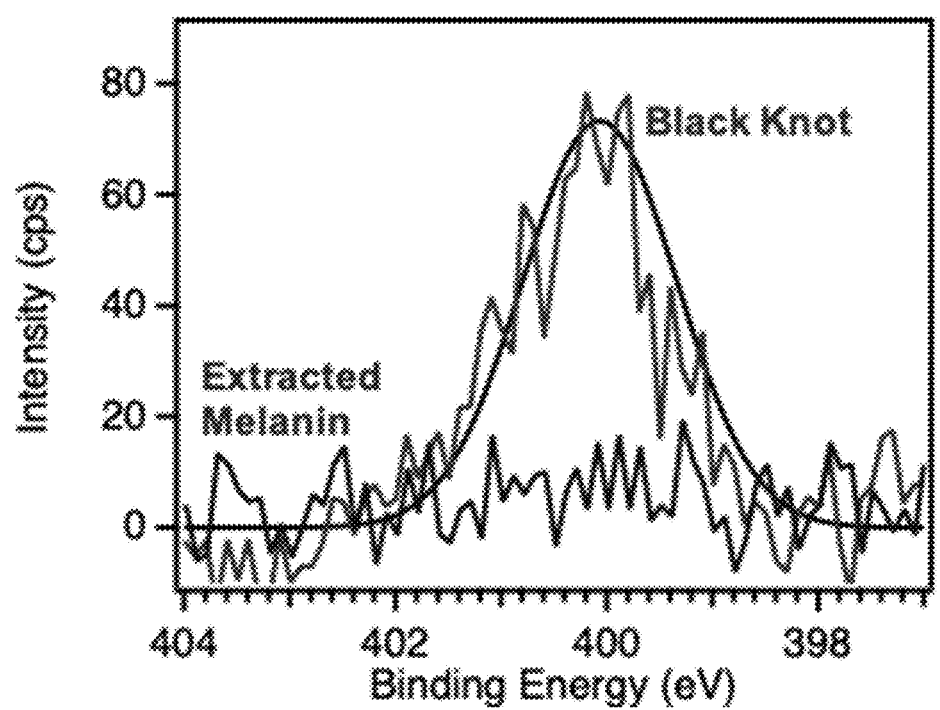
Figure 9D:
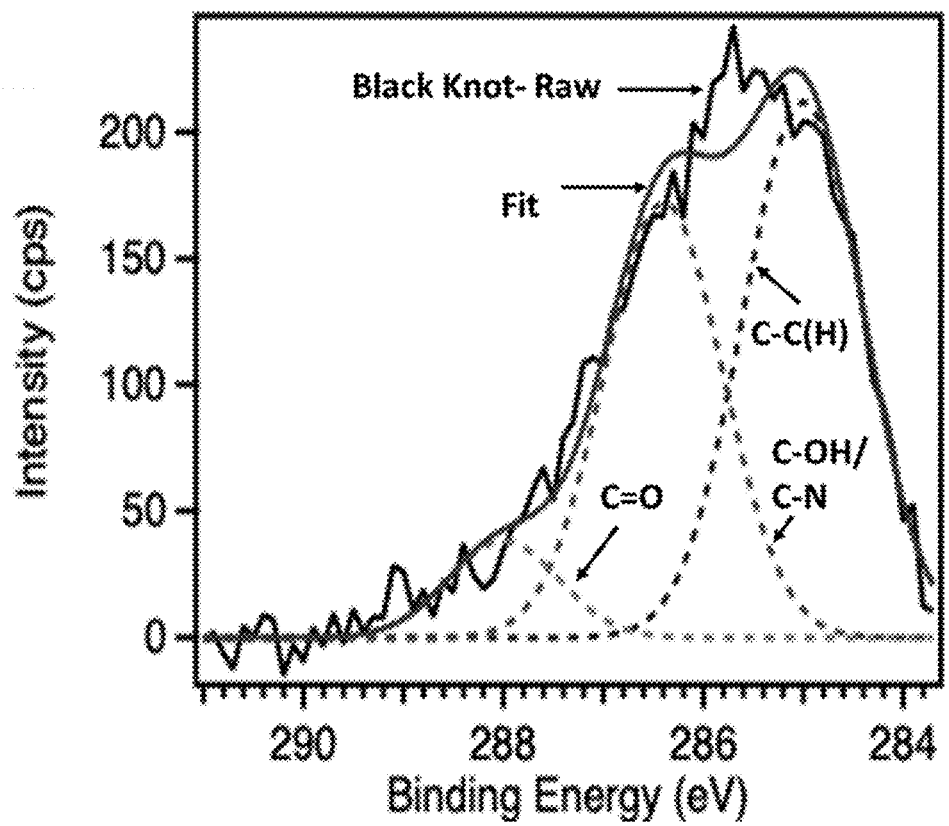

XPS is used to provide further insight into the surface chemical composition of black knot powder and extracted melanin. FIG. 9A shows the survey scans for black knot powder and extracted melanin samples. The black knot survey scan shows predominantly carbon (67.7±4.4%) and oxygen (27.8±4.6%) with small amount of nitrogen (4.2±0.6%), consistent with XPS spectrum reported by Kittle et al. (Kittle, J. D.; Wang, C.; Qian, C.; Zhang, Y.; Zhang, M.; Roman, M.; Morris, J. R.; Moore, R. B.; Esker, A. R. Ultrathin Chitin Films for Nanocomposites and Biosensors. *Biomacromolecules* 2012, 13, 714-718, the disclosure of which is incorporated herein by reference in its entirety) for regenerated chitin films, while the extracted melanin survey scan shows only carbon (74.4±1.6%) and oxygen (24.2±1.9%). Absence of nitrogen in the extracted melanin indicates the likely presence of DHN melanin in black knot fungus (FIG. 9B). To further confirm our results, high-resolution C1s and N1s spectra (FIGS. 9B-D) were collected. After obtaining the raw data, the C1s spectra (FIGS. 9B and 9D) was first corrected by shifting the largest peak to 285 eV and then fit the C1s spectra using five peaks mentioned in the literature for melanin samples: C—C(H) (~285 eV, aliphatic and aromatic bonds taken together), C—OH/C—N(~286.4 eV), C═O (~288 eV), O—C═O (~289.7 eV) and a π-π* shake up at 290-292 eV. Both the black knot powder and extracted melanin samples C1s spectra show predominant peaks corresponding to C—C(H) and C—O/C—N bonds and only minor C═O peak. Contrary to XPS results reported for eumelanin in literature, no peaks related to O—C═O were observed, suggesting that melanin extracted from black knot powder is DHN-based rather than DHI/DHICA-based. This is further corroborated by the absence of any N signal in the extracted melanin high-resolution N1s spectra (FIG. 9C).

5. UV-Vis Absorption Spectrum

Figure 10:
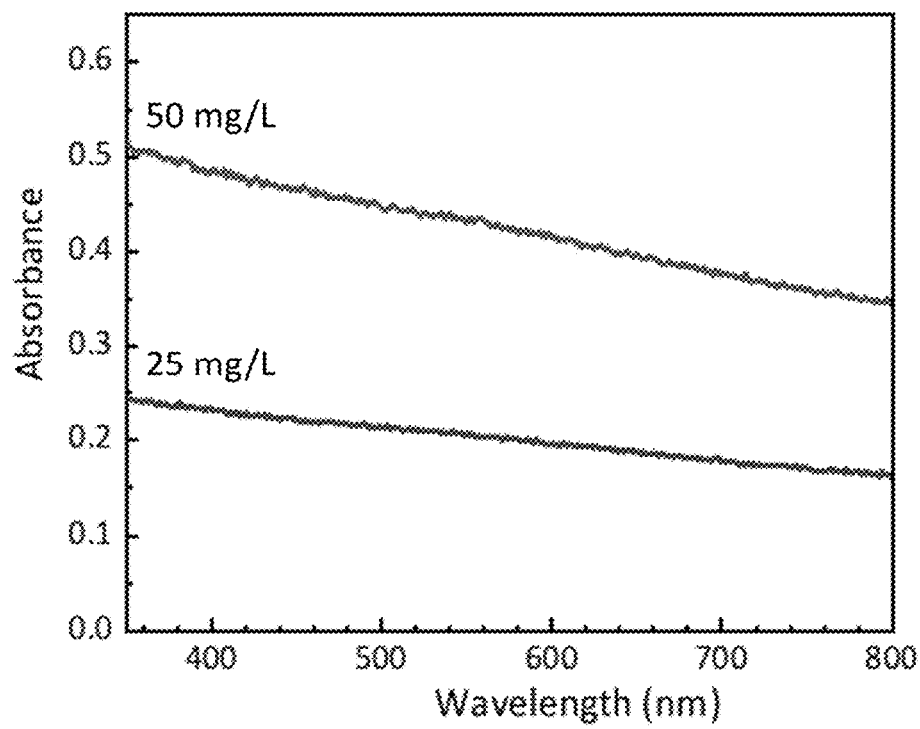
FIG. 10 is a UV-vis absorbance spectra of the extracted melanin at different concentrations.

The extracted melanin UV-visible spectrum shows a broadband absorption of light ranging from 350 to 800 nm in FIG. 10, which is the typical absorption profile of melanin. The absorbance is high in the UV region and gradually reduces as the wavelength increases, because the complex conjugated structure of the melanin can absorb and scatter photon of UV and blue solar light. And as the concentration of extracted melanin has a double increase, the absorbance approximately doubles.

CONCLUSIONS

The morphology, chemical structure and UV-vis absorption property of melanin extracted from the black knot fungus using the acid/base extraction method have been characterized. The SEM images show an irregular morphology of extracted melanin different from other natural melanin. It was also found that the removal of chitin and part of lipid of black knot fungus occurs during the extraction process. The chemical structure of extracted melanin was proved to be similar to DHN as indicated by the absence of nitrogen in the XPS spectrum. Besides, the extracted melanin presents a broadband monotonic absorption of light. The melanin was successfully extracted from the black knot fungus with a yield of ~10%, which makes it to be a potentially cheaper alternative of melanin applied to UV light absorbers and antioxidant reagents.

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Materials

Black knots (*Apiosporina morbosa*) were received from Redhouse Studios, Cleveland, Ohio. Reagent grade sodium hydroxide (NaOH), hydrochloric acid (37% HCl), and ethanol procured from Sigma-Aldrich were used for melanin extraction. All glassware used was cleaned using basebath followed by through rinsing with ultrapure water (18.2 MΩ·cm, Millipore filtration system with deionizing and organic removal columns).

Example 1

Melanin Extraction

Melanin was extracted from black knots using an acid-base extraction procedure. Black knots were scraped for the black outer part leaving the internal wooden part intact. The black part (coarse grains, ~6 g) was ground into a fine powder using a ball mill before boiling in water at 120° C. for 10 min to remove any bacteria and dust particles. After discarding water from the previous step, the left-over black residue was mixed with 250 mL of 1M NaOH and autoclaved at 120° C. for 20 min twice. This step aids in solubilizing the melanin in aqueous media, which was then separated in the supernatant phase from the remaining components by centrifugation at 8000 rpm for 15 min. Afterwards, a concentrated HCl solution (37%) was added to the supernatant until pH equals 1 to allow precipitation of melanin. The precipitated melanin was then collected by centrifugation at 8000 rpm for 15 min, which was further refluxed in concentrated HCl solution (37%) for 1 day to hydrolyze the proteins, carbohydrates, and lipids associated with melanin. The final product was rinsed with ultrapure water (×3), ethanol (×1), and water (×1) again before lyophilizing it to obtain the final melanin powder.

Example 2

Morphological Characterization

Figure 11A:
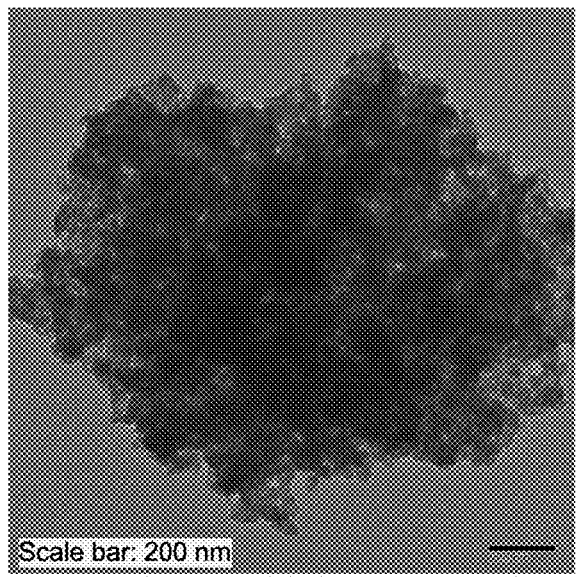
FIGS. 11A-B are TEM images of the extracted melanin at different magnifications.
Figure 11B:
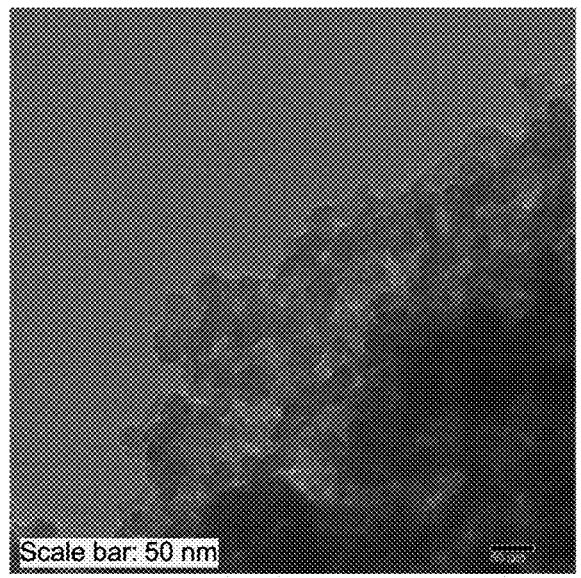

The morphology of the raw black knots and the extracted melanin was analyzed using optical light microscopy (Labophot-Pol Nikon) and SEM (JEOL-7401) with an acceleration voltage of 3-4 kV and a current of 20 μA. Raw black knots were ground into fine powder to observe their morphology. To analyze the morphology of extracted melanin, a small amount of it was suspended in water and then drop-cast on a clean silicon wafer placed on the hot plate to allow quick water evaporation. The silicon wafer was subsequently adhered to an aluminum stub using a double-sided carbon tape to observe the morphology of melanin. The results are shown in FIGS. 3A and 3B The TEM characterization was performed by placing a small droplet of the dilute melanin suspension onto carbon-coated copper grid. After the water completely evaporated, transmission electron microscope (TEM) (JEM-1230, JEOL Ltd.) was used to image the morphology of extracted melanin. The results are shown in FIGS. 11A-B.

Example 3

Raman Spectroscopy

Raman Spectra were collected using a Renishaw InVia Raman Micro Spectrometer coupled to a Leica DM2500 M microscope. A 514 nm green line of the Argon Ion laser was used for excitation and was focused using a 50× objective lens (NA=0.75) on the black knot sample placed on the microscope glass slide. To achieve an optimum signal-to-noise ratio, accumulation time and number of scans were set to 30 s and 3, respectively. Scans were collected for approximately 3 min for each sample, where the Raman signal was detected by a Peltier-cooled CCD detector (1024×256 pixels) with a 2400 line/mm grating. The results are shown in FIG. 2.

Example 4

FTIR Spectroscopy

Infrared spectra were acquired using the Thermo Scientific Nicolet Is50 Fourier transform infrared spectrometer. The black knot (or the extracted melanin) powder (approx. 1-2 mg) was ground with 160 mg of potassium bromide (KBr, FTIR grade, Sigma-Aldrich) by an agate mortar and pestle. The fine ground powder was compressed to a semi-transparent pellet using a die and hydraulic press (OMEGA CN9000). The formed pellets were placed in the vacuum oven at room temperature overnight to remove any adsorbed water. Pure KBr pellet was used as the background for obtaining infrared spectra of samples in the transmission mode. An average of 32 scans were collected with a resolution of 4 $cm^{-1}$ in the 400-4000 $cm^{-1}$ range. The results are shown in FIG. 7.

Example 5

Solid-State NMR

Figure 8A:
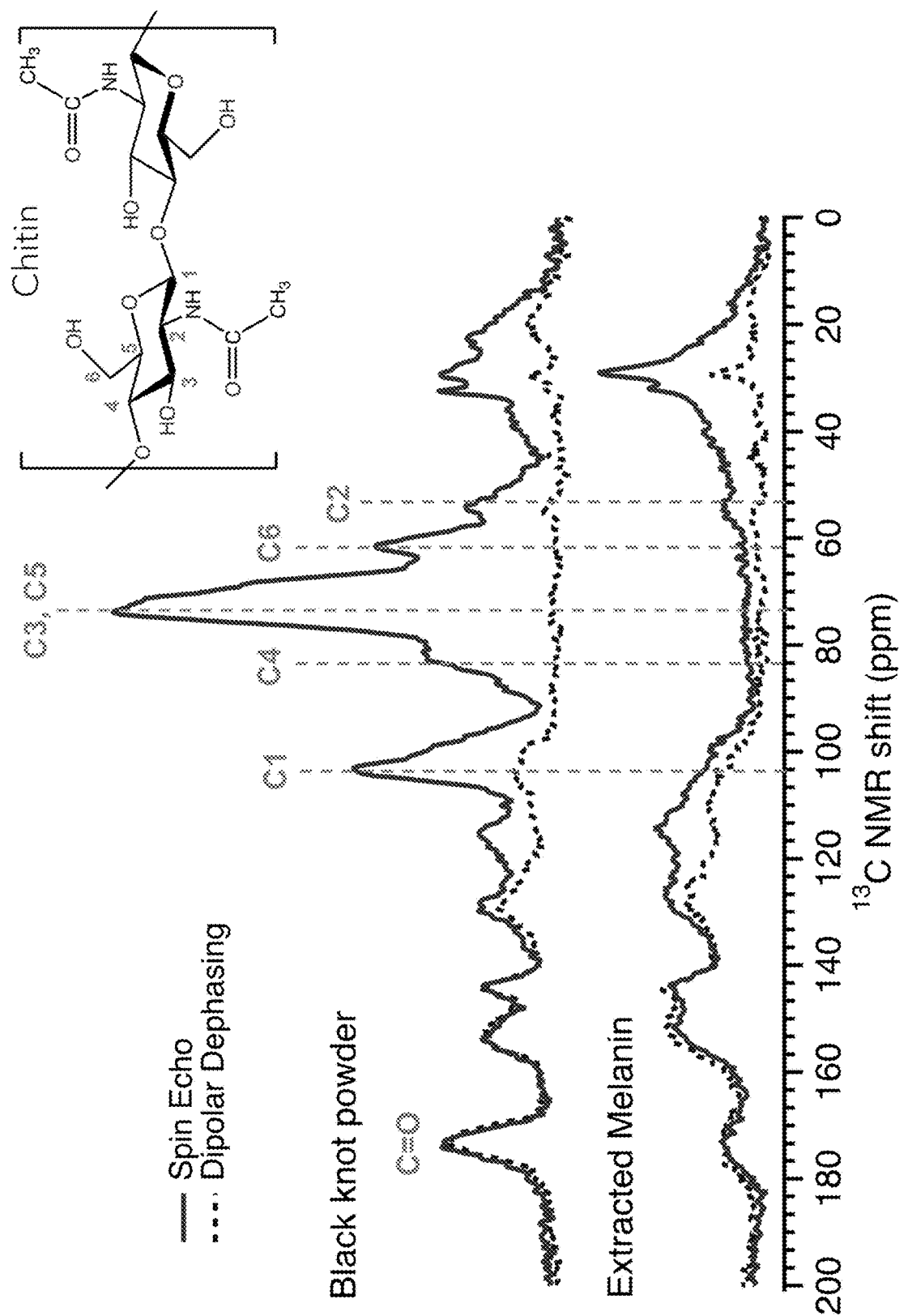
FIGS. 8A-B is a comparison of the spin-echo and dipolar-dephasing ss-NMR spectra of the black knot and the extracted melanin with chitin structure drawn for reference (FIG. 8A) and the biosynthetic pathway of DHN melanin along with schematic of its proposed arrangement in the fungal cell (FIG. 8B).
Figure 8B:
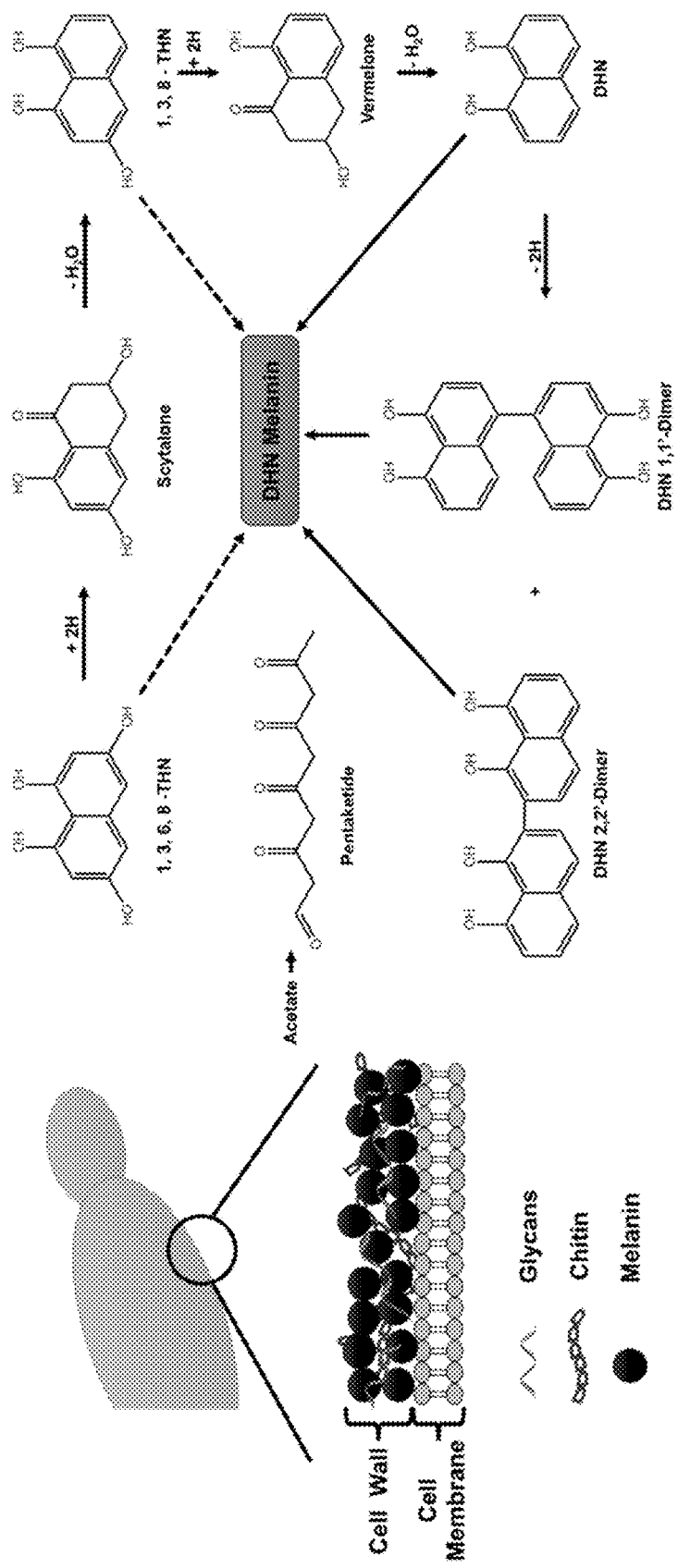

Solid-state $^{13}C$ cross-polarization magic angle spinning (CP/MAS) NMR spectra were collected using the Bruker Avance III 300 NMR with $^{13}C$ and $^1H$ resonance frequencies of 75.6 and 300.1 MHz, respectively. Black knot and extracted melanin powders were placed in two 4 mm diameter cylindrical rotors. The magic-angle spinning (MAS) rate of spin-echo (SE) and dipolar dephasing (DD) experiments was 12 KHz. $^1H$ spin-lattice relaxation time in the laboratory frame ($\tau_{1H}$) was measured by the inversion-recovery method)(180-τ-90° and determined to be 204.8 and 512.5 ms for black knot and extracted melanin powders, respectively. In $^{13}C$ CP/MAS experiments, $^1H$ 90° pulse length, CP contact time, and recycle delay were set to 3.3 μs, 2 ms, and 2 s, respectively. Two-pulse phase-modulated (TPPM) decoupling frequency was set to be 75.8 KHz (180° pulse length of 6.6 μs). The $^{13}C$ chemical shift was calibrated externally based on the methine peak of adamantane at 29.46 ppm. The results are shown in FIG. 8A.

Example 6

X-Ray Photoelectron Spectroscopy (XPS)

XPS scans were collected for black knot powder and extracted melanin using the PHI 5000 Versaprobe III Surface Analysis Instrument from Physical Electronics interfaced with a computer equipped with ULVAC Mutipak software for operation and data analysis. The spectra were recorded with microfocused Al Kα X-ray radiation (25 W, 15 kV, 100 μm) with a probe depth of 10-12 nm. A base pressure less than $2\times10^{-8}$ Pa was used and the operating pressure was approximately $2\times10^{-6}$ Pa. The 117.4 eV pass energy was used for survey scans (0-1400 eV) and pass energy of 11.75 eV was used for the high-resolution C1s scans (278-292 eV). Peak fitting of high-resolution scans was carried out using a standard least-squares algorithm on Multipak software provided by PHI Versa Probe. The C 1s peak is shifted because of the surface charge neutralization, which is corrected by manually shifting the peak to 284.8 eV, the binding energy. Fitting was done using a Gaussian-Lorenztian (90:10) function with a Shirley background subtraction. The results are shown in FIG. 9A-D.

Example 7

UV-Vis Spectrophotometry

UV-vis absorption spectra were collected using a Cary 100 Bio UV-visible spectrophotometer in the range of 300-800 nm. The extracted melanin powder was suspended in distilled water (25 mg/L and 50 mg/L) via sonication (Ultrasonic Cleaner by Branson) for 1 h to break down the aggregates and granules. The solution was stirred using a magnetic stirrer to prevent granules from settling down during the experiment. The results are shown in FIG. 10.

In light of the foregoing, it should be appreciated that the present invention significantly advances the art by providing a melanin composition that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A melanin composition comprising 1,8-dihydroxynaphthalene (DHN) melanin extracted from black knot fungus (*Apiosporina morbosa*) using an acid-base extraction technique.

2. The melanin composition of claim 1 wherein said acid-base extraction technique comprises:
    A) obtaining a powder comprising a black outer part of one or more black knot fungus (*Apiosporina morbosa*), adding a quantity of an aqueous solution comprising one or more base, and heating the mixture to solubilize a melanin in the aqueous solution to form a black alkaline supernatant containing said melanin;
    B) adding one or more acids to said black alkaline supernatant until the melanin precipitates out of said black alkaline supernatant, said melanin precipitate further comprising proteins, carbohydrates, and lipids; and
    C) collecting the melanin precipitate of step B and adding one or more acids to hydrolyze some or all of said proteins, carbohydrates, and lipids and produce the melanin composition of claim 1.

3. The melanin composition of claim 2 comprising a polymer having one or more 1,8-dihydroxynaphthalene (DHN) melanin repeating units.

4. The melanin composition of claim 1 wherein said acid-base extraction technique comprises:
    A) obtaining one or more black knot fungus (*Apiosporina morbosa*) having a black outer part and an inner wooden part;
    B) scraping said black outer part off of said inner wooden part, collecting it, and grinding it to a powder;
    C) boiling said powder in water to remove bacteria and dust;
    D) removing the water to leave a black residue of said powder;
    E) adding a quantity of an aqueous solution comprising one or more base to the black residue of said powder and autoclaving the mixture to solubilize the melanin in an aqueous environment and form a mixture having an aqueous black alkaline supernatant;
    F) collecting a black alkaline supernatant from the mixture of step E and adding one or more acids to said black alkaline supernatant until the melanin precipitates out of said black alkaline supernatant, said melanin precipitate further comprising proteins, carbohydrates, and lipids; and
    G) collecting the melanin precipitate of step F and refluxing it with one or more acids to hydrolyze some or all of said proteins, carbohydrates, and lipids and produce a melanin composition comprising 1,8-dihydroxynaphthalene (DHN) melanin.

5. The melanin composition of claim 4 wherein said acid-base extraction technique further comprises:
    H) washing the melanin composition in deionized water and then in methanol or ethanol; and
    I) washing the melanin composition again in deionized water and then lyophilizing it to form a powder comprising the melanin composition comprising 1, 8-dihydroxynaphthalene (DHN) melanin.

6. The melanin composition of claim 4 wherein said one or more base is NaOH.

7. The melanin composition of claim 4 wherein the step of autoclaving the mixture with one or more acids comprises:
    1) autoclaving the mixture a first time at a temperature of from about 100° C. to about 120° C. for from about 10 min to about 20 min; and
    2) autoclaving the mixture a second time at a temperature of from about 100° C. to about 120° C. for from about 10 min to about 20 min.

8. The melanin composition of claim 4 wherein said one or more acids comprises concentrated HCl.

9. The melanin composition of claim 4 wherein the step of adding one or more acids comprises adding concentrated HCl until the pH of said mixture reaches about 1.0.

10. The melanin composition of claim 4 wherein the step of collecting the melanin precipitate of step F is performed by centrifugation.

11. The melanin composition of claim 4 wherein the step of refluxing the melanin precipitate of step F with one or more acids comprises refluxing the melanin precipitate in a concentrated HCl acid solution for from about 2 to 48 hours.

12. A method for extraction of melanin from black knot fungus comprising:
    A) obtaining a powder comprising a black outer part of one or more black knot fungus (*Apiosporina morbosa*), adding a quantity of an aqueous solution comprising one or more base, and heating the mixture to solubilize a melanin in the aqueous solution to form a black alkaline supernatant containing said melanin;
    B) adding one or more acids to said black alkaline supernatant until the melanin precipitates out of said black alkaline supernatant, said melanin precipitate further comprising proteins, carbohydrates, and lipids; and
    C) collecting the melanin precipitate of step B and adding one or more acids to hydrolyze some or all of said proteins, carbohydrates, and lipids and produce the melanin composition of claim 1.

13. A method for extraction of melanin from black knot fungus comprising:
    A) obtaining one or more black knot fungus (*Apiosporina morbosa*) having a black outer part and an inner wooden part;
    B) scraping said black outer part off of said inner wooden part, collecting it, and grinding it to a powder;
    C) boiling said powder in water to remove bacteria and dust;
    D) removing the water to leave a black residue of said powder;
    E) adding a quantity of an aqueous solution comprising one or more base to the black residue of said powder and autoclaving the mixture to solubilize the melanin in an aqueous environment and form a mixture having an aqueous black alkaline supernatant;
    F) collecting a black alkaline supernatant from the mixture of step E and adding one or more acids to said black alkaline supernatant until the melanin precipitates out of said black alkaline supernatant; and
    G) collecting the melanin precipitate of step F and refluxing it with one or more acids to hydrolyze proteins, carbohydrates, and lipids in said melanin precipitate and produce melanin composition of claim 1.

14. The method of claim 13 further comprising:
H) washing the melanin composition in deionized water and then in methanol or ethanol; and
I) washing the melanin composition again in deionized water and then lyophilizing it to form a powder.

15. The method of claim 13 wherein said one or more base is NaOH.

16. The method of claim 13 wherein the step of autoclaving the mixture with one or more bases comprises:
1) autoclaving the mixture a first time at a temperature of from about 100° C. to about 120° C. for from about 10 min to about 20 min; and
2) autoclaving the mixture a second time at a temperature of from about 100° C. to about 120° C. for from about 10 min to about 20 min.

17. The method of claim 13 wherein said one or more acids comprises concentrated HCl.

18. The method of claim 13 wherein the step of adding one or more acids comprises adding concentrated HCl until the pH of said mixture reaches about 1.0.

19. The method of claim 13 wherein the step of refluxing the melanin precipitate of step F with one or more acids comprises refluxing the melanin precipitate in a concentrated HCl acid solution for from about 2 to 48 hours.

* * * * *